(12) United States Patent
O'Connor (10) Patent No.: US 7,788,526 B2
(45) Date of Patent: Aug. 31, 2010

(54) PROVIDING ENHANCED TOLERANCE OF DATA LOSS IN A DISK ARRAY SYSTEM

(75) Inventor: James A. O'Connor, Ulster Park, NY (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 11/621,634

(22) Filed: Jan. 10, 2007

(65) Prior Publication Data

US 2008/0168225 A1 Jul. 10, 2008

(51) Int. Cl.
G06F 11/00 (2006.01)
(52) U.S. Cl. ......................................... 714/6; 711/114
(58) Field of Classification Search .................. 714/6; 711/114
See application file for complete search history.

(56) References Cited

U.S. PATENT DOCUMENTS

| | | | |
|---|---|---|---|
| 5,303,244 A * | 4/1994 | Watson | 714/5 |
| 5,412,661 A * | 5/1995 | Hao et al. | 714/6 |
| 5,513,192 A | 4/1996 | Janku et al. | |
| 5,848,229 A | 12/1998 | Morita | |
| 6,351,838 B1 * | 2/2002 | Amelia | 714/770 |
| 6,353,895 B1 | 3/2002 | Stephenson | |
| 6,553,511 B1 | 4/2003 | DeKoning et al. | |
| 6,601,138 B2 | 7/2003 | Otterness et al. | |
| 6,606,629 B1 | 8/2003 | DeKoning et al. | |
| 6,675,318 B1 * | 1/2004 | Lee | 714/6 |
| 6,728,922 B1 | 4/2004 | Sundaram et al. | |
| 6,848,022 B2 | 1/2005 | Nanda | |
| 7,000,143 B2 | 2/2006 | Moulton et al. | |
| 7,003,714 B1 | 2/2006 | Sundaram et al. | |
| 7,062,604 B1 | 6/2006 | Nanda | |
| 2006/0031712 A1 * | 2/2006 | Subbarao et al. | 714/6 |

FOREIGN PATENT DOCUMENTS

EP 0612015 A1 8/1994

* cited by examiner

*Primary Examiner*—Yolanda L Wilson
(74) *Attorney, Agent, or Firm*—Cantor Colburn LLP; Steven Chiu (57) ABSTRACT

Systems, methods, and computer program products for enhancing tolerance of data loss in a disk array system have been provided. Systems include a redundant array of independent disks (RAID) storage system including an array of hard disk devices (HDDs) organized in a two dimensional structure of rows and columns of HDDs. The system includes a full stride logically partitioning the rows and columns of HDDs into rows and columns of elements, the full stride including an element from each HDD in the rows and columns of HDDs, each element in the full stride residing on a physically independent HDD. Each element has an element type, wherein a first element type is a data element and a second element type is a checksum element. The system further includes a row checksum element calculated as a checksum of all data elements in a row of the full stride, and a column checksum element calculated as a checksum of all data elements in a column of the full stride, wherein the row checksum element calculation and the column checksum element calculation intersect at a single data element. The system also includes a device adapter for controlling access to the array of HDDs, the device adapter calculating the row checksum element and the column checksum element, the row checksum element and the column checksum element utilized to correct one or more failures in the array of HDDs.

30 Claims, 7 Drawing Sheets

PROVIDING ENHANCED TOLERANCE OF DATA LOSS IN A DISK ARRAY SYSTEM

BACKGROUND OF THE INVENTION

This invention relates generally to disk array architectures, and more particularly to systems, methods, and computer program products for providing enhanced tolerance of data loss in a disk array system.

Computer systems often require a considerable amount of nonvolatile disk storage to preserve software, programs and other data that cannot fit in smaller, more costly random access memory (RAM) and that otherwise would be lost when the system is powered off. Storage systems may include a large number of hard disk drives (HDDs). HDDs are typically constructed using one or more disk shaped platters coated with a magnetic material. The disk platters spin at fixed speeds and a movable arm with a read/write head is directed to specific locations on the disk to write or read data. The head glides just above the surface of the platter. During a data write operation, an electric field is applied to a specific location on the disk creating a substantially permanent magnetic field in a specific direction associated with a binary value of "0" or "1". The head is designed to read stored data by sensing a small current induced in the head by the magnetic field when the head passes over the magnetized location on the platter. When the HDD is powered off, data is preserved as magnetic signatures for bits of information at specific locations on the disk.

HDD platters are partitioned into concentric circles called tracks that are coincident with areas over which the head glides when the arm assembly remains motionless. Each track is further partitioned into sectors. Each sector contains a larger fixed length area for user data, as well as header and trailer information used by the HDD electronics during the data storing and retrieval process. Data read and write times, called latency, are not as fixed and predictable on an HDD as compared to RAM. HDD latency, to a large extent, is a function of the seek time, i.e., the time it takes the arm to reposition the head over the track where the data is to be stored or retrieved. The seek time is variable and a function of the last position of the arm.

HDDs are typically designed as self-contained assemblies that can be plugged into a standard slot in a computer chassis or in a separate storage chassis. In an enterprise environment, a storage chassis has storage drawers that typically hold anywhere from a half dozen to as many as fifty or more individual HDDs. A storage chassis can be either a stand-alone assembly or a rack mountable unit to allow multiple storage drawers to be placed into a single rack, creating a relatively large array of HDDs in a small physical footprint. Drive density per unit area floor space is a competitive metric used in the industry to help potential customers compare offerings from different vendors.

HDDs are complex electromechanical subassemblies and as such are subject to a wide variety of failure mechanisms. Microscopic defects in the magnetic coating materials used on the platter, contamination of the platter with dust, dirt or magnetic particles and aging can all cause data loss. As with all electronics, random failures can occur from a wide variety of underlying physical processes or small defects associated with manufacturing processes. Moving parts are subject to friction and wear out over time, which can also cause HDD assemblies to fail.

HDD technologies have continued to evolve with higher density, faster devices, utilizing new and different disk designs being created at an accelerating rate of change. As HDD rotational speed continues to increase and as HDDs continue to be designed to hold increasing amounts of data, the physical area on a disk that holds the magnetic signature for each bit continues to become smaller, resulting in a greater engineering challenge to ensure reliable write and read operations. To reduce cost, there is now wider use of less expensive and in some applications, less reliable advanced technology attachment (ATA) drives and serial ATA (SATA) drives.

Techniques used to detect and correct bit errors have evolved into an elaborate science over the past several decades. Perhaps the most basic detection technique is the generation of odd or even parity, where the bits in a data word are exclusive OR-ed (XOR-ed) together to produce a parity bit. For example, a data word with an even number of ones will have a parity bit of zero, and a data word with an odd number of ones will have a parity bit of one. A single error in the data word can be detected by comparing the calculated parity to the originally generated parity for the data word.

It has been recognized that the parity technique of error detection could be extended to not only detect errors, but correct errors by appending an error correcting code (ECC) field to each data word. The ECC field may be a combination of different bits in a data word XOR-ed together so that errors (small changes to the data word) can be easily detected, pinpointed, and corrected. The number of errors that can be detected and corrected is directly related to the length of the ECC field appended to the data word. For ECC to function, a minimum separation distance between valid data words and code word combinations must be enforced. The greater the number of errors desired to detect and correct, the longer the code word, resulting in a greater distance between valid code words. The distance between valid code words is also known as the "Hamming distance".

Error detection and correction techniques are commonly used to restore data in storage media where there is a finite probability of data errors due to the physical characteristics of the storage media. Circuits used to store data as voltage levels representing a one or a zero in RAM are subject to both device failure and state changes due to high-energy cosmic rays and alpha particles. HDDs that store ones and zeros, as magnetic signatures on a magnetic surface are also subject to imperfections in the magnetic media and other mechanisms that can cause changes in the data pattern from what was originally stored.

Memory ECC may use a combination of parity codes in various bit positions of a data word to allow detection and correction of errors. Every time a data word is written into memory, a new codeword is generated and stored with the data to support detection and correction.

Many error detection and correction techniques have been extended over the years to help ensure HDD failures do not cause data loss or data integrity issues. Embedded checking mechanisms, such as ECC, are often used on HDDs to detect bad sectors. Cyclic redundancy checks (CRCs) and longitudinal redundancy checks (LRCs) may be used by HDD electronics or a disk adapter to check for errors. Alternatively, higher levels of code and applications may use CRCs and LRCs to detect HDD errors. CRC and LRC values are written coincident with data to help detect data errors. CRCs and LRCs are hashing functions used to produce a small substantially unique bit pattern generated from the data. When the data is read from the HDD, the associated check value is regenerated and compared to the value stored on the platter. The signatures must match exactly to ensure that the data retrieved from the disk is the same as was originally written to the disk.

Redundant array of independent disks (RAID) systems have been developed to improve performance and increase availability of disk storage systems. RAID distributes data across several independent HDDs. Many different RAID schemes have been developed with different associated characteristics. Performance, availability, and utilization/efficiency (the percentage of the disks that actually hold user data) are perhaps the most important characteristics to consider in comparing RAID schemes. The tradeoffs associated with various schemes have to be carefully considered, because an improvement in one characteristic can often result in a reduction in another.

RAID 5 is used widely today, achieving a balance between performance, availability and utilization. RAID 5 uses a single parity field that is calculated by XORing data elements across multiple HDDs in a stripe. A "stripe" refers to a complete and connected set of data and parity elements that are dependently related to the parity computation relations. In coding theory, the stripe is a code word or code instance. In the event of a single HDD failure, data on the remaining disks in the stripe are XOR-ed together to recreate the data from the failed disk. As with many other RAID schemes, RAID 5 has a performance advantage in that the data from all HDDs in a stripe do not have to be read to recalculate a new parity value for the stripe every time a write occurs. When writing small amounts of data, such as updating single data elements, a technique known as read-modified-write (RMW) is used whereby old data from a single HDD is read along with old parity from another HDD. The old data is XOR-ed with new data and the old parity to produce a new parity value, which is then written back to disk along with the new data. RMW can be a considerable performance improvement especially with wide-width RAID 5 arrays. RAID 5 typically uses a distributed parity scheme whereby parity fields are substantially uniformly distributed across all the HDDs in the array to help balance read/write access to each HDD, ensuring more consistent performance.

A RAID 5 array can continue to operate after a single HDD has failed in the array. Data from the failed disk can be regenerated by XOR-ing data from the remaining disks in the data stripe with the parity field. When the failed HDD is replaced or if there is a spare HDD in a RAID 5 array, the data from the failed HDD can be completely recreated and rewritten to the new disk using the same XOR process. Systems are often designed such that failed HDDs can be replaced concurrently with normal system operation. Data on a replacement HDD is rebuilt in a process that can take several hours to complete. RAID 5 can only tolerate a single HDD failure, as there is no way to reconstruct the data when two HDDs fail in the same data stripe. If a second HDD in the RAID 5 stripe fails before the first failed HDD is replaced and rebuilt, all the data associated with the RAID 5 stripe will be lost. The probability of encountering a second HDD failure is directly related to how quickly the failed HDD is replaced or spared out and the data reconstructed and written to the replacement/spare HDD.

RAID 6 is an extension to RAID 5 where a second independent checksum field is introduced so that two HDD failures can be tolerated. RAID 6 is commonly implemented as a dual checksum fields for each stripe or row of data. In RAID 6, the second independent checksum field is typically created using Reed-Solomon codes which is a more complex operation than the simple RAID 5 XOR of the data elements and thus may be more difficult to implement, requiring additional computational resources.

An "array" typically refers to a collection of HDDs on which one or more instances of a RAID error correction code is implemented. Reed-Solomon codes can correct for erasures when the sources of the failures can be isolated through some independent means. This is often referred to as data erasure correction. Reed-Solomon codes also have the ability to pinpoint and correct a failure; however, the effectiveness of correction is cut in half when the failure cannot be pinpointed by some independent means. For example, RAID 6 can be used to correct up to two erasures when the failures are isolated through some independent means, or the RAID 6 code in and of itself can be used to pinpoint and correct a single failure. An "element" typically refers to a fundamental unit of data or parity, the building block of the error correction codes. In coding theory, an element or "symbol" may be composed of a fixed number of bits, bytes or blocks often stored as contiguous sequential sectors on an HDD. A "strip" typically refers to a collection of contiguous elements on a single HDD. A set of strips in a codeword form a stripe. A strip may contain data elements, parity elements or both from the same disk and stripe. In coding theory, a strip is associated with a code word and is sometimes called a stripe unit. It is common for strips to contain the same number of elements. In some cases, stripes may be grouped together to form a higher level construct know as a "stride".

The availability of a RAID array is often characterized by its Hamming distance. For example, RAID 5 has a Hamming distance of two. RAID 5 can tolerate a single HDD failure, but cannot tolerate two or more HDD failures. RAID 6 has a Hamming distance of three since it can tolerate up to two HDD failures and still continue to operate. Often improvements in one performance attribute results in degradation of other attributes. For example, with all else being equal, RAID 6 may have lower performance than RAID 5, because the second checksum field may be updated on every write. RAID 6 may also be less efficient than RAID 5 due to the additional overhead of the second checksum field. RAID 5 adds the equivalent of one HDD to the array to hold the checksum field. In other words, for RAID 5 to store the equivalent of N data disks, N+1 physical disks are required. RAID 6 adds the equivalent of two HDDs to the array to hold two checksum fields. RAID 6 requires N+2 physical disks to hold the equivalent of N data disks.

A problem that can occur on disks is known as a "strip kill", where a strip of data on the disks can no longer be read. A strip kill causes data loss to a small portion of data on the disks. With RAID 5, the data lost in a strip kill may be corrected by using the normal RAID XOR algorithm. Strip kills, although rare, can occur during a rebuild operation of a failed HDD. A strip kill may occur during a rebuild operation, because all the data on all the disks in the array must be read and XOR-ed together to reconstruct the data on the failed disks. If a strip kill is encountered during a RAID 5 rebuild, the rebuild cannot complete, and the data on the RAID 5 array is lost. A similar problem arises in RAID 6, if a rebuild of two HDDs is in process, and a strip kill is encountered. However, if there is a rebuild in process of a single HDD fail on a RAID 6 array and a strip kill is encountered, it is possible to recover in a similar manner as two HDD recovery for RAID 6.

Systems have been contemplated where parity is calculated horizontally and diagonally across strips of data in a single row of disks. Other systems have been contemplated that use horizontal and vertical parity, but are limited to square N×N implementations, where horizontal parity is calculated across a row of N disks and vertical parity is calculated across N strips of the row of N disks. Furthermore, such systems do not distribute parity and data elements across independent physical disks, limiting the failure recovery capability to a maximum of two HDDs. Previously contemplated RAID systems often included circular dependencies or other interdependencies that prevented data reconstruction of certain blocks after two HDD failures. Systems using diagonal parity also suffer from sizing constraints in that the number of columns cannot be greater than the number of rows when the diagonal parity is stored with each row.

While RAID 6 provides improved availability over RAID 5, both approaches breakdown when failures occur in multiple HDDs or in data elements aligned within an HDD row. For RAID 5, failures in a row alignment of two HDDs or two data element combinations in a stripe result in a system failure. For RAID 6, failures in a row alignment of three HDDs or three data elements combinations in the stripe result in a system failure. HDD failures are often modeled as independent random events; however, disk systems have been known to exhibit a cluster failure where a common problem source can take out multiple HDDs in a row. Both RAID 5 and RAID 6 are susceptible to cluster failures. Additionally, the higher availability of RAID 6 over RAID 5 typically requires more complex and costly hardware to implement Reed-Solomon coding in the second checksum. Accordingly, there is a need in the art for providing enhanced tolerance of data loss in a disk array system.

BRIEF SUMMARY OF THE INVENTION

Embodiments include a redundant array of independent disks (RAID) storage system including an array of hard disk devices (HDDs) organized in a two dimensional structure of rows and columns of HDDs. The system includes a full stride logically partitioning the rows and columns of HDDs into rows and columns of elements, the full stride including an element from each HDD in the rows and columns of HDDs, each element in the fall stride residing on a physically independent HDD. Each element has an element type, wherein a first element type is a data element and a second element type is a checksum element. The system further includes a row checksum element calculated as a checksum of all data elements in a row of the full stride, and a column checksum element calculated as a checksum of all data elements in a column of the fall stride, wherein the row checksum element calculation and the column checksum element calculation intersect at a single data element. The system also includes a device adapter for controlling access to the array of HDDs, the device adapter calculating the row checksum element and the column checksum element, the row checksum element and the column checksum element utilized to correct one or more failures in the array of HDDs.

Additional embodiments include a device adapter for controlling access to an array of HDDs organized in a two-dimensional structure of rows and columns of HDDs, the device adapter including access control logic to manage read requests and write requests to the HDDs in the array of HDDs. The access control logic maps a full stride of data elements and checksum elements to the array of HDDs, wherein each element in the full stride resides on a physically independent HDD in the array of HDDs. The device adapter further includes checksum calculation logic to calculate a row checksum element and a column checksum element of the data elements in the full stride. The device adapter also includes HDD failure detection logic to identify a failed HDD in the array of HDDs. Furthermore, the device adapter includes correction logic utilizing at least one of the row checksum element and the column checksum element to correct an element of a full stride containing a failed HDD in response to the HDD failure detection logic identifying the failed HDD.

Further embodiments include a method for providing enhanced tolerance to data loss on three HDDs in an array of HDDs. The method includes organizing the array of HDDs in a two-dimensional structure of rows and columns of HDDs, and partitioning the rows and columns of HDDs into rows and columns of elements. Each element has an element type, wherein a first element type is a data element and a second element type is a checksum element. The method further includes creating a full stride from the rows and columns of elements, including an element from each HDD in the rows and columns of HDDs, each element in the full stride residing on a physically independent HDD. The method also includes calculating a row checksum element as a checksum of all data elements in a row of the full stride, and calculating a column checksum element as a checksum of all data elements in a column of the full stride, wherein the row checksum element calculation and the column checksum element calculation intersect at a single data element. Furthermore, the method includes using the row checksum element and the column checksum element to correct one or more HDD failures in the array of HDDs.

Further embodiments include a RAID storage system including more than one array of hard disk devices HDDs, each array of HDDs organized in a two-dimensional structure of rows and columns of HDDs. Each array of HDDs includes more than one full stride, each full stride logically partitioning the rows and columns of HDDs into rows and columns of elements, each full stride includes an element from each HDD in the rows and columns of HDDs, and each element in each full stride resides on a physically independent HDD. Each element has an element type, wherein a first element type is a data element and a second element type is a checksum element. The system includes row checksum elements calculated as a checksum of all data elements in a row of each full stride, and column checksum elements calculated as a checksum of all data elements in a column of each full stride. The system also includes more than one device adapter for controlling access to the more than one array of HDDs, each device adapter calculating the row checksum elements and the column checksum elements, and each device adapter operating in tandem providing redundant access control for the more than one array of HDDs.

Additional embodiments include a computer program product for providing enhanced tolerance to data loss in an array of HDDs. The computer program product includes a storage medium readable by a processing circuit and storing instructions for execution by the processing circuit for facilitating a method including organizing the array of HDDs in a two-dimensional structure of rows and columns of HDDs, and partitioning the rows and columns of HDDs into rows and columns of elements. Each element has an element type, wherein a first element type is a data element and a second element type is a checksum element. The computer program product includes creating a full stride from the rows and columns of elements, including an element from each HDD in the rows and columns of HDDs, where each element in the full stride resides on a physically independent HDD. The computer program product further includes calculating a row checksum element as a checksum of all data elements in a row of the full stride, and calculating a column checksum element as a checksum of all data elements in a column of the full stride, wherein the row checksum element calculation and the column checksum element calculation intersect at a single data element. The computer program product also includes using the row checksum element and the column checksum element to correct one or more HDD failures in the array of HDDs.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Exemplary embodiments, as shown and described by the various FIGs. and the accompanying text, provide systems, methods, and computer program products for providing enhanced tolerance of data loss in a disk array system. Through the use of two-dimensional checksums across disks in a disk array system, an improved capability to withstand three hard disk drive (HDD) failures in the disk array system is provided. In exemplary embodiments, independent row and column checksums are produced through RAID 5-type exclusive-OR (XOR) operations upon data to produce independent checksums across data organized in rows and columns of HDDs in a disk array system. Thus, exemplary embodiments are referred to herein as "RAID $5^2$" (RAID 5 Squared).

Figure 1:
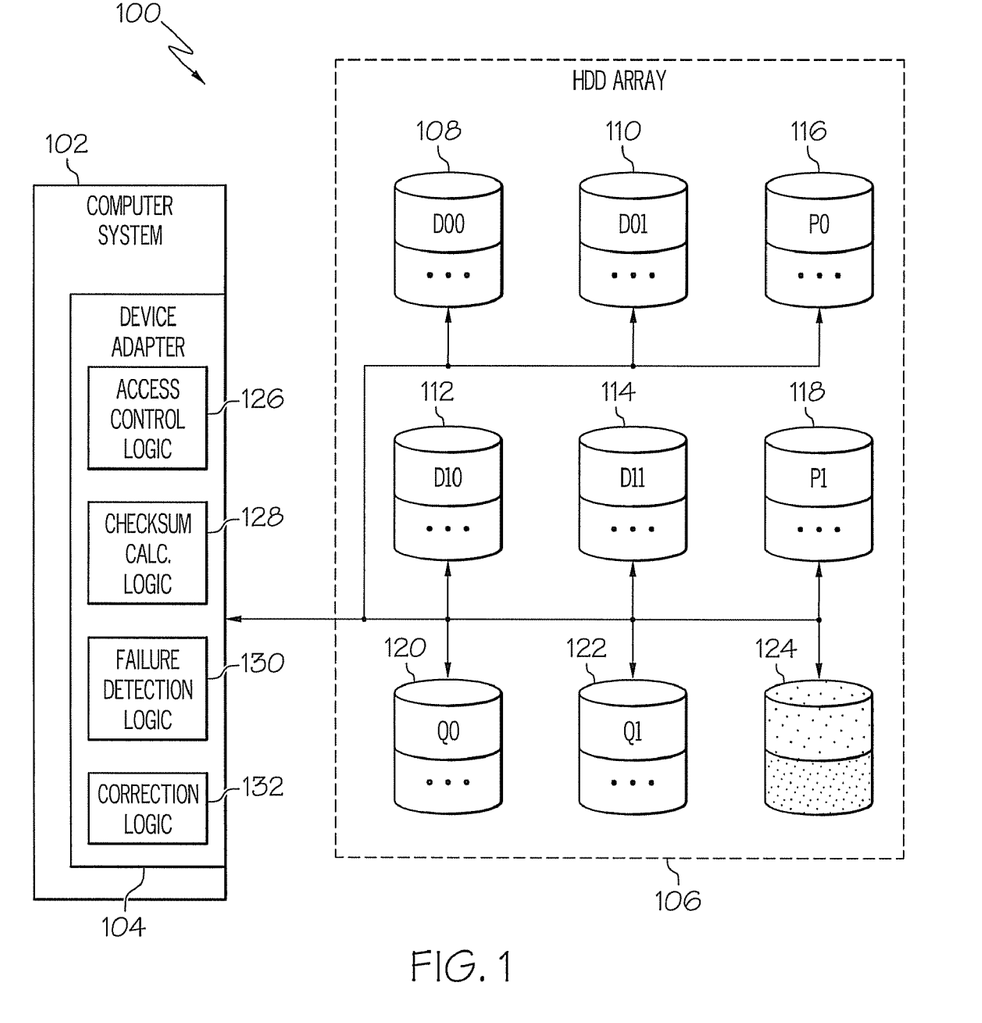
FIG. 1 is a block diagram of a system for providing enhanced tolerance of data loss in a disk array system that may be implemented by exemplary embodiments.

Turning now to the drawings in greater detail, it will be seen that in FIG. 1 there is a block diagram of a system 100 upon which enhanced tolerance of data loss in a disk array system can be implemented in accordance with exemplary embodiments. The system 100 of FIG. 1 includes a computer system 102, which executes software that commits data to and retrieves data from non-volatile storage. A device adapter 104 is coupled to the computer system 102, controlling access to an HDD array 106. Although only one device adapter 104 is depicted in the system 100, it will be understood that there may be multiple device adapters operating in tandem, i.e., collaboratively or independently controlling access to the HDD array 106, while providing redundancy protection. In exemplary embodiments, the device adapter 104 is controlled through one or more device driver programs executed by the computer system 102. The device adapter 104 may include a storage medium readable by a processing circuit and storing instructions for execution by the processing circuit. The device adapter 104 may further include one or more microcontrollers, direct memory access (DMA) controllers, application specific integrated circuits (ASICs), and control logic circuitry or software for performing various control, fault detection, and correction functions.

In exemplary embodiments, the device adapter 104 includes access control logic 126, checksum calculation logic 128, HDD failure detection logic 130, and correction logic 132. The access control logic 126 manages read requests and write requests to HDDs in the HDD array 106, mapping a full stride of data elements and checksum elements to the HDDs in the HDD array 106. In exemplary embodiments, each element in the full stride resides on a physically independent HDD. In exemplary embodiments, the checksum calculation logic 128 calculates a row checksum element and a column checksum element of the data elements for each row and column in the full stride. The HDD failure detection logic 130 identifies one or more failed HDDs in the array of HDDs. The correction logic 132 utilizes at least one of the row checksum elements or the column checksum elements to correct an element of a full stride containing a failed HDD.

In exemplary embodiments, the HDD array 106 includes multiple HDDs 108-122, and an optional HDD 124. Although the system 100 depicts eight HDDs 108-122 and one optional HDD 124, it will be understood that the HDD array 106 may be configured in any combination of HDDs organized as rows and columns. The device adapter 104 distributes data and checksums across the HDD array 106 by logically partitioning the HDD array 106 into rows and columns. In exemplary embodiments, the computer system 102 passes blocks of data to the device adapter 104, and the device adapter 104 maps the data to the multiple HDDs 108-122 of the HDD array 106 through the access control logic 126. The device adapter 104 also writes row and column checksums to row and column checksum elements within the HDD array 106. Data is partitioned in the HDD array 106 as data elements, such as D00 on HDD 108, D01 on HDD 110, D10 on HDD 112, and D11 on HDD 114. A data element or a checksum element may be any size, such as a single byte, or a block of contiguous bytes, such as 32 kilobytes, 64 kilobytes, 128 kilobytes, etc.

In exemplary embodiments, the checksum calculation logic 128 calculates both row and column checksum values. A row checksum may be calculated for the data elements of each row as a P checksum element using standard RAID 5-type XORs. For example, P0 on HDD 116 may be calculated as D00 XOR D01, and P1 on HDD 118 may be calculated as D10 XOR D11. In a similar manner, a column checksum may be calculated for the data elements of each column as a Q checksum element using standard RAID 5-type XORs. For example, Q0 on HDD 120 may be calculated as D00 XOR D10, and Q1 on HDD 122 may be calculated as D01 XOR D11. The XOR operations are also referred to as an XOR summation and may be symbolically represented as "$\oplus$". Since the P checksums are generated with data across rows and the Q checksums are generated with data across columns, no data element is used more than once in the P and Q checksums (i.e., a row checksum element calculation and a column checksum element calculation intersect at a single data element), and thus independence is maintained without the use of more mathematically complex schemes such as Reed-Solomon coding. Although row and column checksums may be calculated using standard RAID 5-type XORs, any checksum technique known in the art may be utilized in exemplary embodiments.

The optional HDD 124 is a placeholder (reserved element) that may be populated to provide an additional checksum upon the row checksum elements (P values), the column checksum elements (Q values), or a combination thereof. If the optional HDD 124 is included in the system 100, there is no combination of three HDD failures that can cause the system 100 to fail. This is a very desirable attribute; however, there may be a performance impact associated with updating the optional HDD 124, since the row checksum elements or the column checksum elements within a full stride need to be calculated before the checksum element for the optional HDD 124 can be computed. In exemplary embodiments, the dependency of the checksum element within the optional HDD 124 upon other checksum elements requires additional computation time and additional I/O operations to the HDD array 106, which may impact system performance. Nevertheless, RAID $5^2$ provides significantly better tolerance to combinations of three HDD failures over row RAID 6, even without populating the optional HDD 124.

While data elements and checksum elements are depicted in the system 100 as located on particular HDDs (e.g., D00 on HDD 108), the partitioning is not limited to a static configuration. In exemplary embodiments, the rows and columns of HDDs 108-122 in the HDD array 106 are logically partitioned into rows and columns of elements, referred to as a "full stride". A full stride includes an element from each HDD 108-122, including data elements D00, D01, D10, D11, row checksum elements P0 and P1, column checksum elements Q0 and Q1, and optionally, a reserved element. Each element represents a relative partitioning position within a full stride and resides on a physically independent HDD. For example, the full stride depicted in FIG. 1 includes a first row of elements D00, D01, and P0; a second row of elements D10, D11, and P1; and third row of elements Q0, Q1, and optionally, a reserved element. The full stride depicted in FIG. 1 may also be referenced as a first column of elements D00, D10, and Q0; a second column of elements D01, D11, and Q1; and a third column of elements P0, P1, and optionally, a reserved element. In exemplary embodiments, the access control logic 126 manages the mapping of elements to HDDs, and may rotate the mapping of elements to HDDs on a full stride basis. The HDD array 106 may include many full strides (e.g., thousands) distributed across the HDDs 108-122 and optionally, HDD 124.

As large blocks of data are written to or read from the HDD array 106, multiple full strides may be accessed. In exemplary embodiments, the data and checksum elements are shifted or rotated between HDDs in each full stride. For example, a full stride may include 32 kilobytes of data, with data elements of 8 kilobytes each on D00, D01, D10, and D11. If the computer system 102 attempts to write a block of 64 kilobytes of data to the HDD array 106, the block would span two full strides. The relative position of each element (e.g., D00) may shift between HDDs 108-122 for each full stride. Although each full stride contains a data element D00, the particular HDD upon which D00 is mapped may rotate between successive full strides. For example, data element D00 may be located on HDD 108 in the first full stride, and D00 may shift to HDD 110 in the second full stride. Similarly, each data and checksum element may rotate through HDDs 108-122 between successive full strides. The rotation reduces the risk of HDD failures due to overuse, as frequently accessed checksum information is distributed between HDDs 108-122 at each full stride rather than assigning dedicated parity HDDs.

A variety of techniques known in the art can be used to identify which HDDs have failed within the HDD array 106. For example, an HDD may stop responding to commands, or embedded checking mechanisms on each HDD 108-122 may identify a failed drive using techniques such as parity, cyclic redundancy checks (CRCs), or longitudinal redundancy checks (LRCs). In exemplary embodiments, the HDD failure detection logic 130 within the device adapter 104 identifies one or more failed HDDs in the HDD array 106.

Once HDD failures are identified, failed data can be corrected through the correction logic 132 within the device adapter 104. Using row and column checksums of the data stored in the HDD array 106, many failure modes can be accommodated. Not only can all two HDD failures be corrected, but many combinations of three HDD failures can be accommodated as well. For example, if D00, D10, and Q0 fail, D00 can be reconstructed as D01 XOR P0; D10 can be reconstructed as D11 XOR P1; and Q0 can be reconstructed after D00 and D10 are reconstructed as D00 XOR D10. In exemplary embodiments, alternative checksum algorithm specific techniques may be employed based upon the specific checksum algorithm utilized by the system 100. The sequence of corrections can be determined through analyzing the number of failures in a full stride, identifying rows or columns that contain only single failures, and iteratively correcting all single failures. Thus, a full column could fail and the column could be corrected on a row-by-row basis, as each row would contain only one failure.

Generally for RAID $5^2$, the number of three HDD failure combinations that result in data loss is equivalent to the number of data element rows (A) multiplied by the number of data element columns (N), resulting from simultaneous failures at points of intersection of data, row checksum, and column checksum elements. In contrast, RAID 6 implementations using dual checksum elements are susceptible to a larger number of three HDD failures, as:

$$A\left[\frac{N(N+1)(N+2)}{3!}\right].$$

By computing the ratio of the number of combinations of three HDD failures for RAID 6 divided by that of RAID$5^2$, the magnitude of the improvement becomes apparent. In others words, RAID $5^2$'s tolerance to three HDD failure combinations is proportional to the square of the equivalent number of data element HDDs in the array. Thus, for RAID$5^2$, the number of combinations of three HDD failures that cause a system failure or data loss is linearly related to the total number of HDDs in the array. This is a highly desirable attribute because the greater the number of HDDs in the array, the greater the magnitude of the improvement in RAID $5^2$'s ability to withstand three HDD failures resulting in data loss events. The more HDDs in the system, the greater the magnitude of the improvement, as RAID 6 is susceptible to data loss in $$\frac{(N+1)(N+2)}{6}$$

more combinations than RAID $5^2$.

Figure 2:
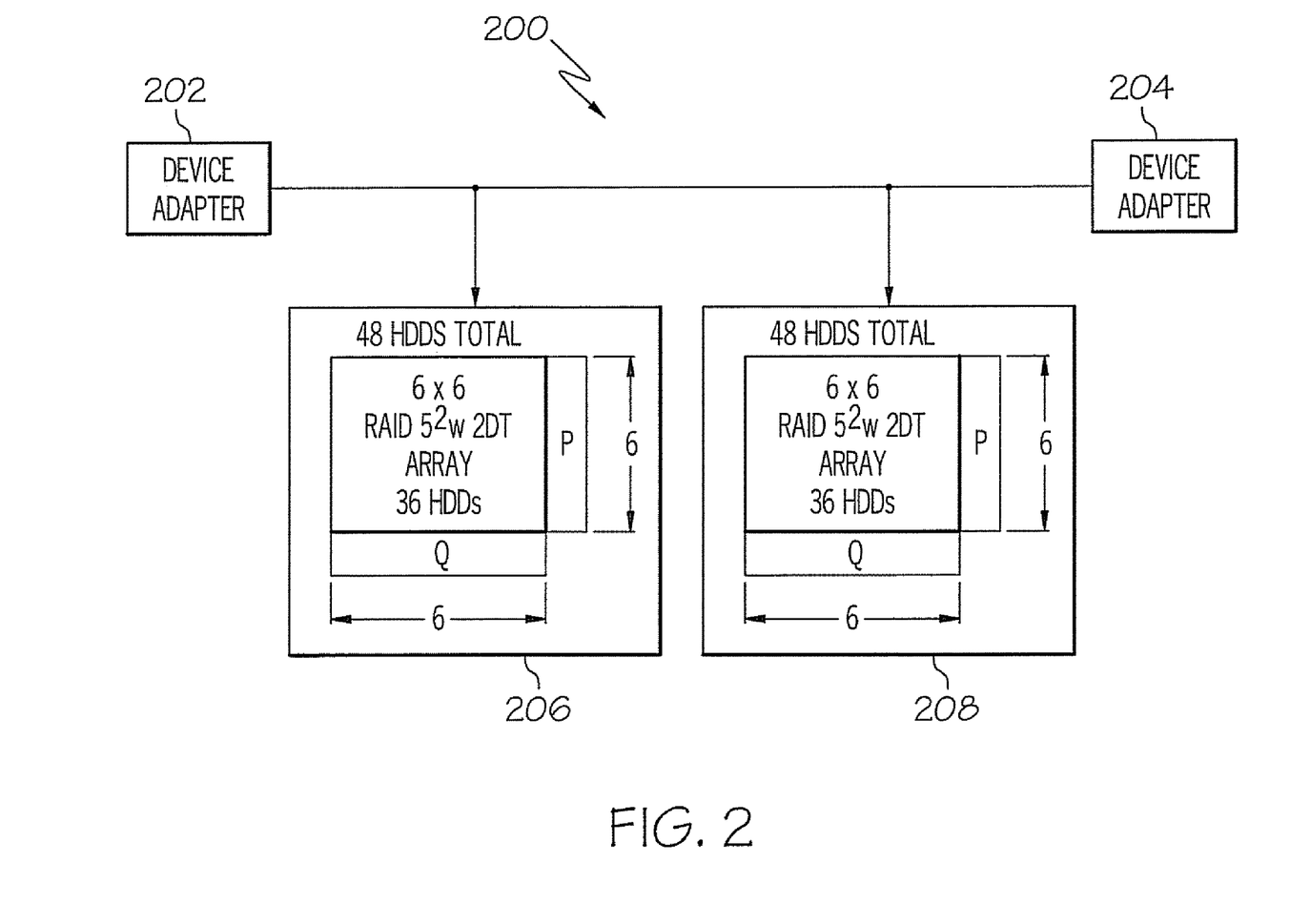
FIG. 2 is a block diagram of a RAID $5^2$ system in a dual 6×6 data element configuration that may be implemented by exemplary embodiments.

Turning now to FIG. 2, a system 200 upon which enhanced tolerance of data loss in a disk array system can be implemented will now be described in accordance with exemplary embodiments. The system 200 includes up to 96 HDDs connected to a pair of device adapters 202 and 204. In exemplary embodiments, the device adapters 202 and 204 coordinate access requests to HDDs, providing behavior that is similar to a single disk controller system. The device adapters 202 and 204 may work in tandem, sharing the workload and providing redundancy to improve system reliability over systems with a single device adapter or disk controller. The system 200 includes HDD arrays 206 and 208, configured as two RAID $5^2$ building blocks of 48 HDDs each. Organizing the HDDs of the system 200 as RAID $5^2$ building blocks enables addition or subtraction of capacity as storage needs change over time. HDD arrays 206 and 208 each include 36 data HDDs, organized as 6 data element row HDDs by 6 data element column HDDs. HDD arrays 206 and 208 each further include 6 row checksum element HDDs (P values) and 6 column checksum element HDDs (Q values). The row checksum elements and column checksum elements are calculated in a two-dimensional manner, also referred to as "two-dimensional triangulation" (2DT), as previously described. Similar to the system 100 of FIG. 1, the assignment of data elements and checksum elements to the HDDs within each HDD array 206 and 208 may rotate between full strides. Thus a data element HDD in one full stride may become a checksum element HDD in a subsequent full stride, and vice versa. The RAID $5^2$ configuration of the system 200 has a disk utilization, the percentage of total storage available for user data versus checksum data, of 75%, which is equivalent to a comparable RAID 6 configuration; yet the RAID $5^2$ configuration achieves a 9× availability improvement to withstand data loss due to three HDD failures.

As RAID $5^2$ configurations are realized with varying dimensions of rows and columns, a general set of equations can be scaled accordingly. In exemplary embodiments, a row checksum element (P) for a RAID $5^2$ row can be calculated for a given row (r) as: $P_r = D_{r0} \oplus D_{r1} \oplus \ldots \oplus D_{r(N-1)}$, where D values represent the data elements of the row and N represents the number of data element columns. When a data element is updated (e.g., $D_{rc\_new}$), a new row checksum element ($P_{r\_new}$) can be calculated using the old row checksum element ($P_{r\_old}$), the new data element ($D_{rc\_new}$), and the old data element ($D_{rc\_old}$) as: $P_{r\_new} = P_{r\_old} \oplus D_{rc\_new} \oplus D_{rc\_old}$, thereby updating the row checksum element without reading all of the data elements in the row. To reconstruct a data element (e.g., $D_{rc}$), all other data elements within the row can be XOR-ed with the row checksum element as: $D_{rc} = D_{r0} \oplus \ldots \oplus D_{r(c-1)} \oplus \ldots \oplus D_{r(N-1)} \oplus P_r$. Similarly, in exemplary embodiments, a column checksum element (Q) for a RAID $5^2$ column can be calculated for a given column (c) as: $Q_c = D_{0c} \oplus D_{1c} \oplus \ldots \oplus D_{(A-1)c}$, where D values represent the data elements of the column and A represents the number of data element rows. When a data element is updated (e.g., $D_{rc\_new}$), a new column checksum element ($Q_{c\_new}$) can be calculated using the old column checksum element ($Q_{c\_old}$), the new data element ($D_{rc\_new}$), and the old data element ($D_{rc\_old}$) as: $Q_{c\_new} = Q_{c\_old} \oplus D_{rc\_new} \oplus D_{rc\_old}$, thereby updating the column checksum element without reading all of the data elements in the column. To reconstruct a data element (e.g., $D_{rc}$), all other data elements within the column can be XOR-ed with the column checksum element as: $D_{rc} = D_{0c} \oplus \ldots \oplus D_{(r-1)c} \oplus D_{(r+1)c} \oplus Q_c$. In exemplary embodiments, alternative checksum algorithm specific techniques may be employed based upon the specific checksum algorithm utilized by a RAID $5^2$ system.

Figure 3:
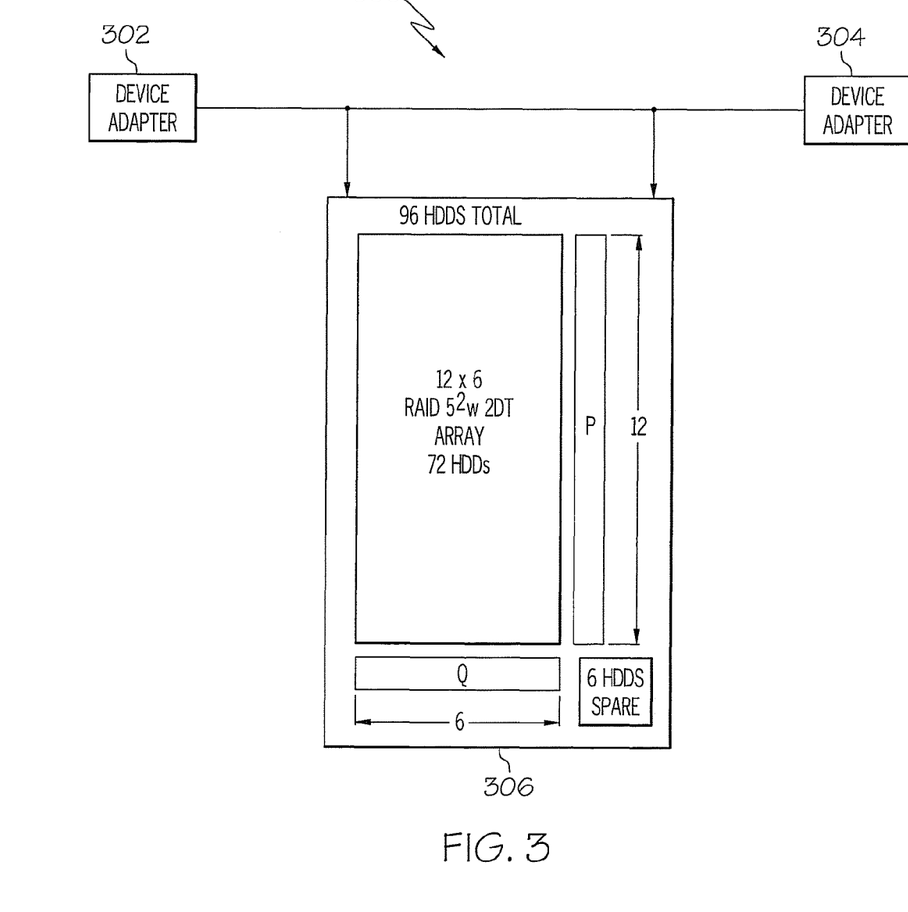
FIG. 3 is a block diagram of a RAID $5^2$ system in a single 12×6 data element configuration that may be implemented by exemplary embodiments.

Turning now to FIG. 3, a system 300 upon which enhanced tolerance of data loss in a disk array system can be implemented will now be described in accordance with exemplary embodiments. The system 300 includes up to 96 HDDs connected to a pair of device adapters 302 and 304. The HDDs of the system 300 are configured as a single RAID $5^2$ block 306. The RAID $5^2$ block 306 is organized as 12 data element row HDDs by 6 data element column HDDs. The RAID $5^2$ block 306 further includes 12 row checksum element HDDs (P values) and 6 column checksum element HDDs (Q values). Similar to the system 100 of FIG. 1, the assignment of data elements and checksum elements to the HDDs within the RAID $5^2$ block 306 may rotate between full strides, i.e., the position of each element in each full stride relative to the array of HDDs is rotated to a different position between successive full strides relative to the array of HDD. Components of the system 300 provide similar performance characteristics and features as previously described systems 100 and 200. The RAID $5^2$ block 306 also includes up to 6 online spare HDDs that may be swapped in when an HDD fails, serving as replacement disks for HDD rebuild operations without intervention of a technician. One of the 6 spare HDDs within the RAID $5^2$ block 306 may serve as a reserved element disk, providing an optional checksum of either the P checksum elements, Q checksum elements, or a combination thereof. Fewer than all 6 spare HDDs may be populated to reduce the overall system cost. The availability improvement of the RAID $5^2$ system 300 over a RAID 6 configuration remains at 9×, but the efficiency, disk utilization of 80%, is greater than a comparable row RAID 6 configuration with a disk utilization of 75% due to a reduced number of Q checksum elements in the system 300. The online spare HDDs of the RAID $5^2$ system 300 also significantly improve overall availability, because they can be varied into the configuration automatically when any HDD fails without waiting for a qualified person to conduct a repair action. Thus, the online spare HDDs can greatly improve overall system availability by reducing the time lapse before a failed disk is replaced. The shorter the time lapse between a disk failure and disk replacement, the less likely it is to run into a combination of three disk failures that result in a system failure.

Figure 4:
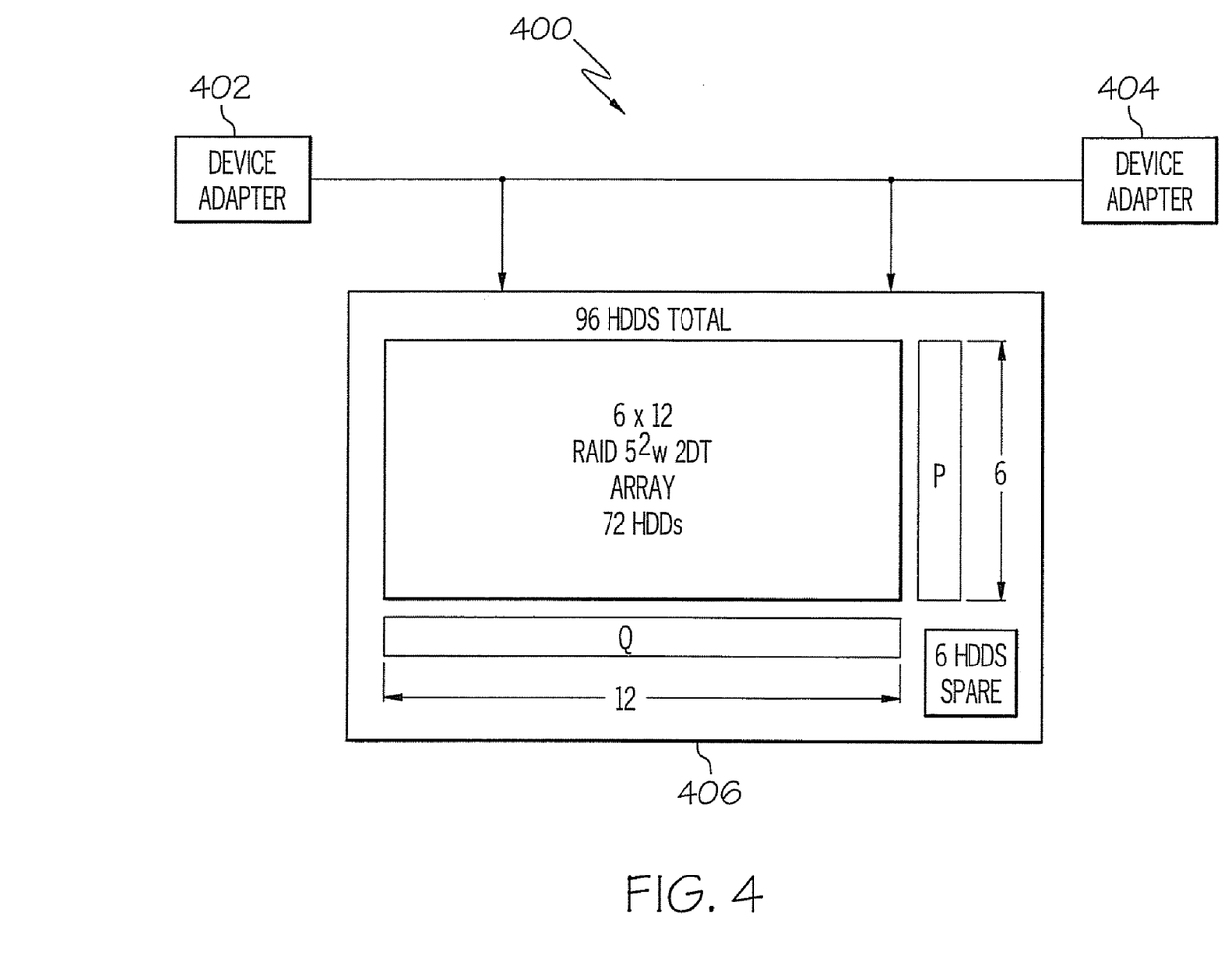
FIG. 4 is a block diagram of a RAID $5^2$ system in a single 6×12 data element configuration that may be implemented by exemplary embodiments.

Turning now to FIG. 4, a system 400 upon which enhanced tolerance of data loss in a disk array system can be implemented will now be described in accordance with exemplary embodiments. The system 400 includes up to 96 HDDs connected to a pair of device adapters 402 and 404. The HDDs of the system 400 are configured as a single RAID $5^2$ block 406. The system 400 of FIG. 4 is similar to the system 300 of FIG. 3, except that the dimensions of the RAID $5^2$ blocks are transposed. The RAID $5^2$ block 406 is organized as 6 data element row HDDs by 12 data element column HDDs. The RAID $5^2$ block 406 further includes 6 row checksum element HDDs (P values) and 12 column checksum element HDDs (Q values). The RAID $5^2$ block 406 also includes 6 spare HDDs, with similar uses and constraints as previously described with respect to the system 300 of FIG. 3. The availability improvement of the RAID $5^2$ system 400 over a RAID 6 configuration is 30×. The HDD utilization efficiency of the RAID $5^2$ system 400 is 80%, which is less than a comparable row RAID 6 configuration, with an HDD utilization efficiency of 86%. However, the reduced HDD utilization efficiency of the RAID $5^2$ system 400 results in a 2× improvement in HDD rebuild time using the Q checksum elements versus the P checksum elements.

Figure 5:
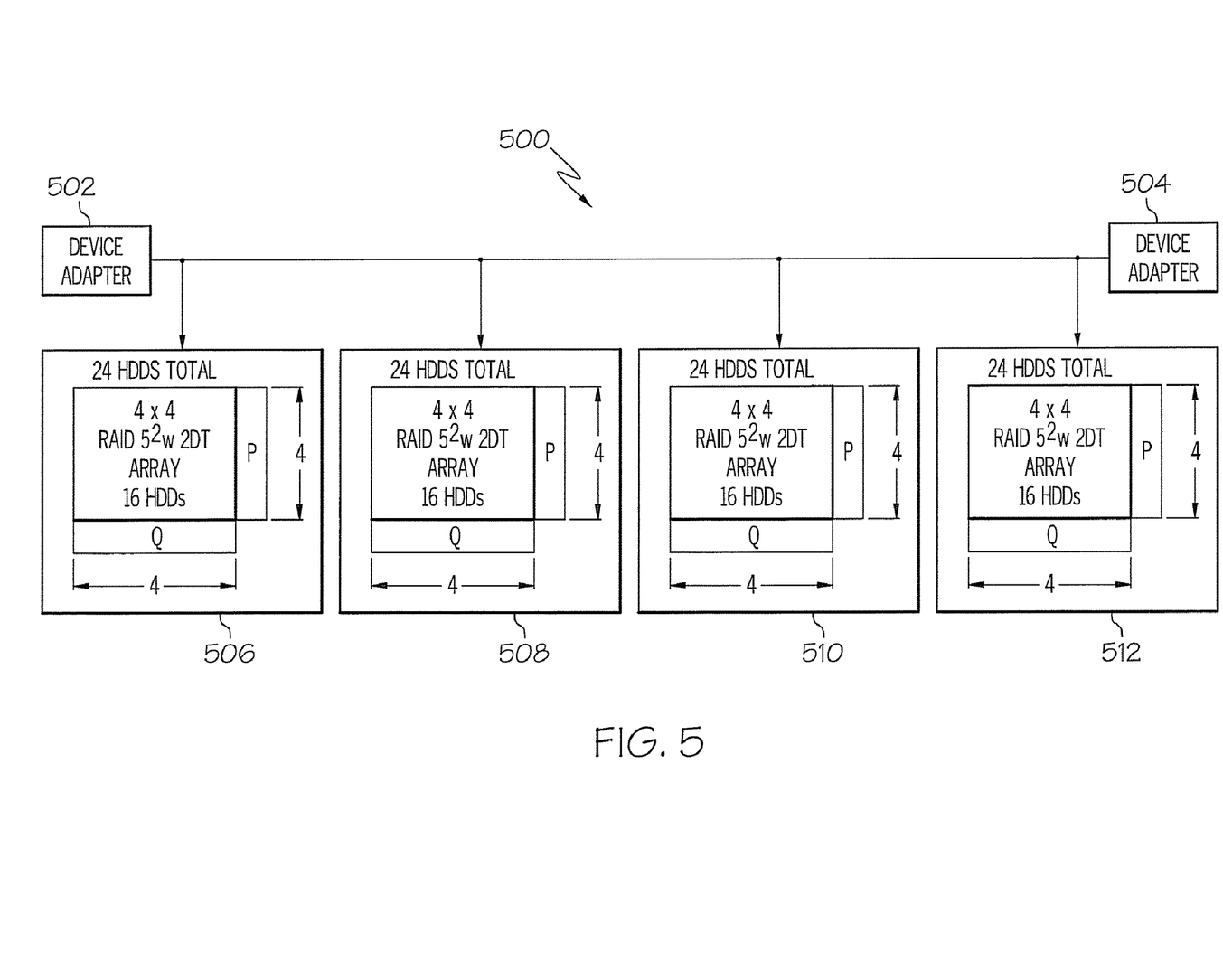
FIG. 5 is a block diagram of a RAID $5^2$ system in a quad 4×4 data element configuration that may be implemented by exemplary embodiments.

Turning now to FIG. 5, a system 500 upon which enhanced tolerance of data loss in a disk array system can be implemented will now be described in accordance with exemplary embodiments. The system 500 includes up to 96 HDDs connected to a pair of device adapters 502 and 504. The HDDs of the system 500 are configured as a four RAID $5^2$ blocks 506, 508, 510, and 512, with 24 HDDs per RAID $5^2$ block. Each RAID $5^2$ block 506, 508, 510, and 512 is organized as 4 data element row HDDs by 4 data element column HDDs. Each RAID 5² block 506, 508, 510, and 512 further includes 4 row checksum element HDDs (P values) and 4 column checksum element HDDs (Q values). The components of the system 500 provide features and functionality similar to previously described systems, such as the systems 100 and 200 of FIGS. 1 and 2. Each RAID 5² block 506, 508, 510, and 512 may be added to or removed from the system 500 incrementally. The smaller RAID 5² block sizes of the system 500, as compared to the system 200 of FIG. 2, provide increased flexibility in scaling RAID 5² solutions to the needs of various enterprises. The RAID 5² system 500 has disk utilization of 67%, which is equivalent to a comparable RAID 6 configuration, yet the RAID 5² system 500 achieves a 5× availability improvement in ability to withstand data loss due to three HDD failures.

Figure 6:
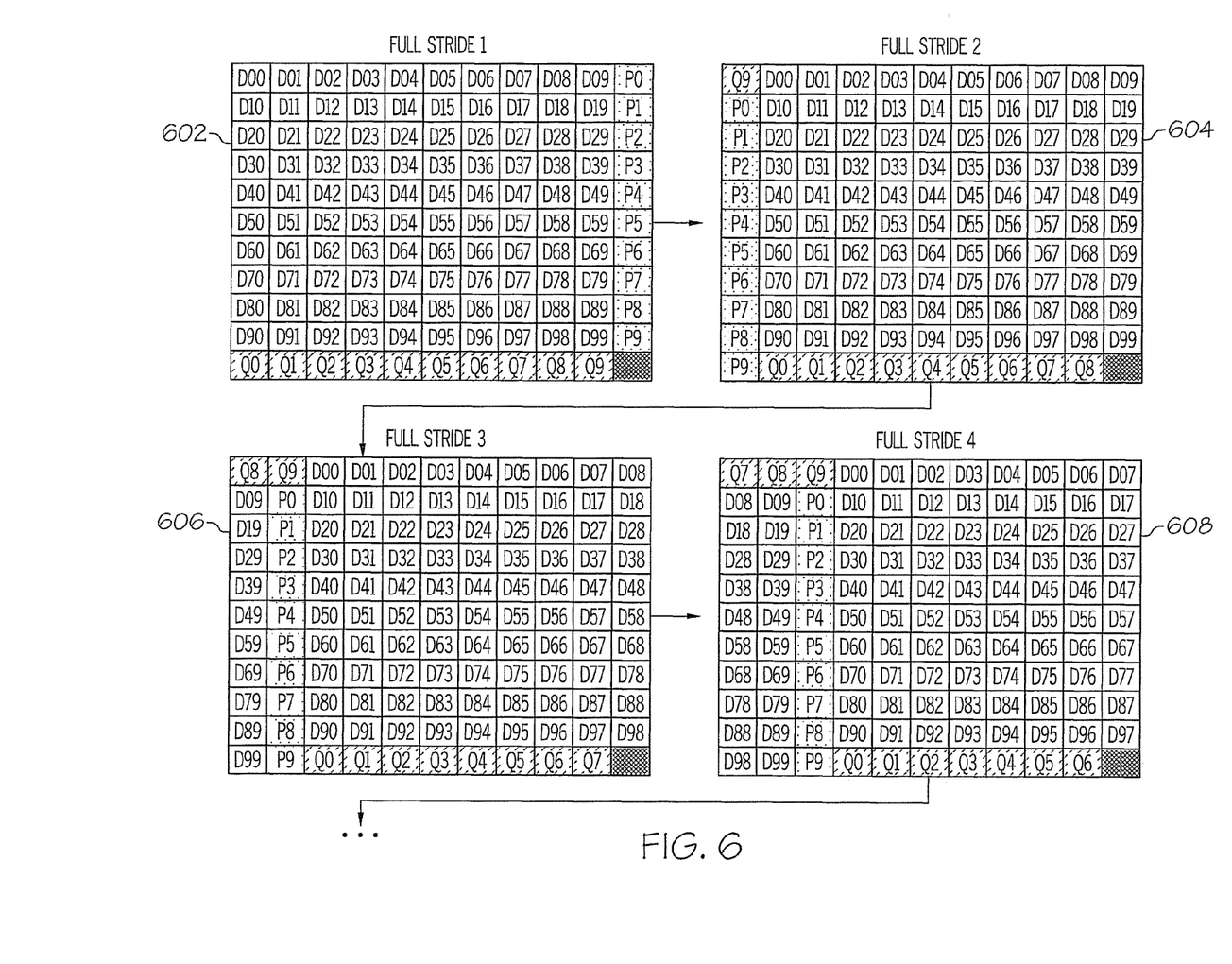
FIG. 6 depicts a data and checksum element rotation progression between successive full strides in a 10×10 data element RAID $5^2$ system that may be implemented by exemplary embodiments.

Turning now to FIG. 6, an exemplary data and checksum element rotation progression between successive full strides in a 10×10 data element RAID 5² system will now be described in accordance with exemplary embodiments. FIG. 6 provides an example of the progression of data elements and checksum elements as they rotate between physically independent HDDs in successive full strides. Each grid 602, 604, 606, and 608 represents successive full strides on a common array of 120 HDDs using RAID 5², consistent with previously described systems. In exemplary embodiments, the HDD positioned in the upper left corner of the HDD array contains successive elements: D00 of full stride 1, Q9 of full stride 2, Q8 of full stride 3, and Q7 of full stride 4. Although the rotation of elements between full strides depicted in grids 602-608 appears as single incremental shifts in a rotational pattern, any repeatable pattern of shifts or rotation of elements between HDDs in successive full strides may be supported. For example, the sequence could be reversed such that full stride 1 equates to grid 608, full stride 2 equates to grid 606, full stride 3 equates to grid 604, and so forth. In exemplary embodiments, the rotation pattern continues for successive full strides beyond those depicted in FIG. 6.

The black box at the bottom right corner of grids 602-608 represents an optional HDD for holding reserved elements consistent with the optional HDD 124 of FIG. 1. For a configuration where the optional HDD is unutilized, there is no bottom right corner back box. When the optional HDD is populated, the HDD array of FIG. 6 contains 121 HDDs. A reserved element (i.e., the bottom right corner black box) in each full stride may rotate in a pattern consistent with the data and checksum elements, distributing the checksum value in the reserved element substantially uniformly across all of the HDDs in the HDD array. Furthermore, the inclusion of a reserved element in each full stride increases the Hamming distance to 4 so that the RAID 5² configuration can fully tolerate up to 3 HDD failures, at a cost of increased complexity and reduced HDD utilization efficiency.

Figure 7:
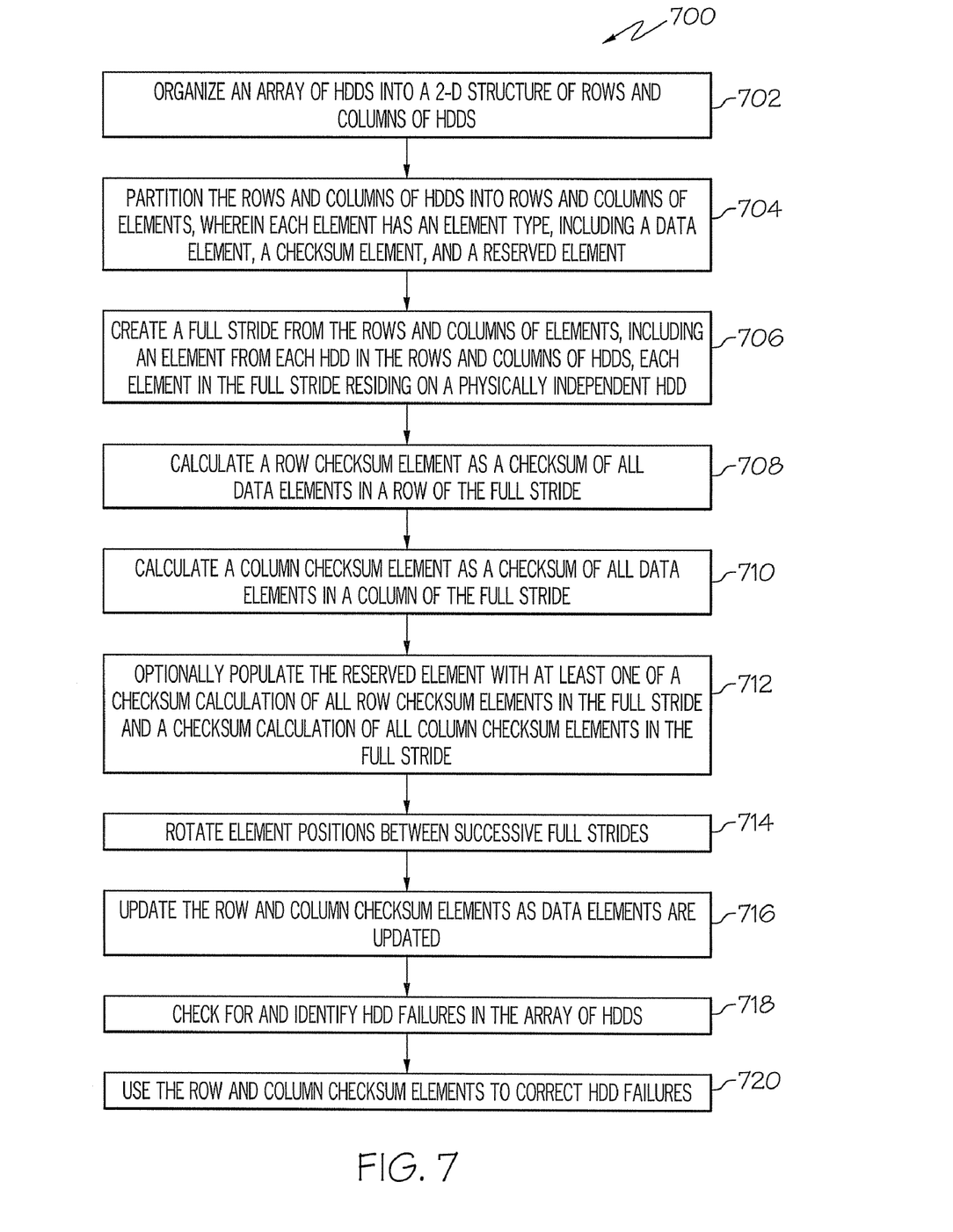
FIG. 7 is a flow diagram describing a process for implementing RAID $5^2$ in exemplary embodiments.

Turning now to FIG. 7, a process 700 for implementing RAID 5² will now be described in accordance with exemplary embodiments. In exemplary embodiments, the process 700 provides enhanced tolerance to data loss on three HDDs in an array of HDDs, such as HDD array 106 of FIG. 1. At block 702, the array of HDDs is organized in a two-dimensional structure of rows and columns of HDDs. At block 704, the rows and columns of HDDs are partitioned into rows and columns of elements, where each element has an element type, including a data element, a checksum element, and a reserved element. In exemplary embodiments, the partitioning of the rows and columns of HDDs into rows and columns of elements is controlled by the access control logic 126 of the device adapter 104 of FIG. 1. At block 706, a full stride is created from the rows and columns of elements, including an element from each HDD in the rows and columns of HDDs, where each element in the full stride resides on a physically independent HDD. In exemplary embodiments, the access control logic 126 manages the rows and columns of elements as a full stride. While many full strides may be created and managed in exemplary embodiments, the checksum calculation process is described in reference to a single full stride for ease of explanation.

At block 708, a row checksum element is calculated by the checksum calculation logic 128 as a checksum of all data elements in a row of the full stride. At block 710, a column checksum element is calculated by the checksum calculation logic 128 as a checksum of all data elements in a column of the full stride. In exemplary embodiments, the row checksum element calculation and the column checksum element calculation intersect at a single data element. In exemplary embodiments, the row checksum element is stored in a separate element column from the data elements included in the row checksum element calculation, and the column checksum element is stored in a separate element row from the data elements included in the column checksum element calculation. Row and column checksums are calculated for each row and column of data elements in the full stride. At block 712, the reserved element is optionally populated with at least one of a checksum calculation of all row checksum elements in the full stride and a checksum calculation of all column checksum elements in the full stride. The row and column checksum calculations in blocks 708, 710, and optionally 712 may employ any simultaneous equations intersecting at a single data element. The checksum calculations in blocks 708, 710, and optionally 712 may utilize any method known in the art, such as an XOR summation, Reed-Solomon equations, or any error detection/correction algorithm capable of detecting an error and providing a unique error correction solution. A simple checksum calculation method, such as an XOR summation may be preferred to minimize complexity and system cost.

At block 714, the access control logic 126 rotates element positions between successive full strides, wherein the position of each element in each full stride relative to the array of HDDs is rotated to a different position between successive full strides relative to the array of HDDs. If the reserved element is populated, it may be included in the element rotation between successive full strides.

At block 716, the row checksum element and the column checksum element are updated by the access control logic 126 and the checksum calculation logic 128 as data elements are updated. In exemplary embodiments, when old data in a data element of a full stride is replaced with new data, a new row checksum is calculated as an XOR summation of the old row checksum, the new data, and the old data, when the old row checksum is calculated as an XOR summation. The new row checksum is written to the row checksum element. Similarly, in exemplary embodiments, a new column checksum is calculated as an XOR summation of the old column checksum, the new data, and the old data, when the old row checksum is calculated as an XOR summation. A similar calculation and update technique may be employed for other checksum calculation algorithms. The new column checksum is written to the column checksum element. If the reserved element is populated, then it is also updated as changes occur to the elements upon which the reserved element depends.

At block 718, a check is performed by the failure detection logic 130 to detect the presence of one or more HDD failures in the array of HDDs and determine the number of failures in a full stride containing the one or more HDD failures. A sequence of correction is selected by the correction logic 132 based upon the distribution of failures in the full stride containing the one or more HDD failures through identifying rows or columns containing single failures as the initial elements to correct. At block 720, the row checksum element and the column checksum element are used by the correction logic 132 to correct one or more HDD failures in the array of HDDs. The row checksum element may be used to correct an element in an element row of a full stride containing the one or more HDD failures as a checksum calculation of all other elements in the element row of the full stride containing the one or more HDD failures. The column checksum element may be used to correct an element in an element column of a full stride containing the one or more HDD failures as a checksum calculation of all other elements in the element column of the full stride containing the one or more HDD failures. Alternatively, depending upon the checksum algorithm employed, checksum algorithm specific correction techniques may be utilized to correct HDD failures.

Technical effects and benefits of exemplary embodiments include calculating dual orthogonal checksum values as simple XOR calculations, as opposed to more complex Reed-Solomon coding utilized by RAID 6. Further technical effects and benefits include rotating data and checksum elements between HDDs in full stride increments, thus reducing the risk of rapid HDD wear out associated with dedicated checksum HDDs. Advantages include an improved ability to withstand three HDD failures in an array of HDDs as compared to RAID 6, providing an order of magnitude improvement in preventing data loss with no degradation in performance in exemplary embodiments. Further advantages include shorter rebuild time using Q checksums by a proportional amount for RAID $5^2$ configurations with lower efficiency than comparable RAID 6 configurations. Faster rebuild performance with RAID $5^2$ further reduces the risk of data loss associated with strip skills during a rebuild operation. HDD utilization, the percentage of total storage available for user data versus checksum data, can be improved by increasing the number of disks in a RAID $5^2$ HDD row or column, while rebuild time can be reduced by decreasing the HDD utilization.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A redundant array of independent disks (RAID) storage system comprising:
    an array of hard disk devices (HDDs) organized in a two-dimensional structure of rows and columns of HDDs;
    a full stride logically partitioning the rows and columns of HDDs into rows and columns of elements, the full stride including an element from each HDD in the rows and columns of HDDs, each element in the full stride residing on a physically independent HDD;
    each element having an element type, wherein a first element type is a data element and a second element type is a checksum element;
    a row checksum element calculated as a checksum of all data elements in a row of the full stride;
    a column checksum element calculated as a checksum of all data elements in a column of the full stride;
    wherein the row checksum element calculation and the column checksum element calculation intersect at a single data element, the row checksum element and the column checksum element updated as part of a write operation updating the data element;
    additional full strides, wherein each element position in each full stride relative to the array of HDDs is rotated to a different position between successive full strides relative to the array of HDDs; and
    a device adapter for controlling access to the array of HDDs, the device adapter calculating the row checksum element and the column checksum element, the row checksum element and the column checksum element utilized to correct one or more failures in the array of HDDs.

2. The system of claim 1, wherein the device adapter further performs:
    detecting a failure in the array of HDDs;
    correcting an element in an element row of a full stride containing the failure as a checksum calculation of all other elements in the element row of the full stride containing the failure; and
    correcting an element in an element column of a full stride containing the failure as a checksum calculation of all other elements in the element column of the full stride containing the failure.

3. The system of claim 2, wherein the device adapter further performs:
    determining the number of failures in the full stride; and
    selecting a sequence of correction based upon a distribution of failures in the full stride through identifying rows or columns containing single failures as initial elements to correct.

4. The system of claim 1, wherein the device adapter further performs:
    replacing old data in a data element of the full stride with new data, the old data included in an old row checksum and an old column checksum, wherein the old row checksum and the old column checksum are XOR summation checksums;
    calculating a new row checksum as an XOR summation of the old row checksum, the new data, and the old data;

writing the new row checksum to the row checksum element;
calculating a new column checksum as an XOR summation of the old column checksum, the new data, and the old data; and
writing the new column checksum to the column checksum element.

5. The system of claim 1 further comprising:
a third element type, wherein the third element type is a reserved element; and
an additional HDD in the array of HDDs, the additional HDD providing capacity for inclusion of a reserved element in the full stride;
wherein the reserved element is populated with at least one of a checksum calculation of all row checksum elements in the full stride and a checksum calculation of all column checksum elements in the full stride.

6. The system of claim 1 further comprising a spare HDD in the array of HDDs, the spare HDD providing capacity to rebuild a failed HDD.

7. The system of claim 1 further comprising a second device adapter, the second device adapter for controlling access to the array of HDDs, and operating in tandem with the device adapter.

8. The system of claim 1, wherein a number of combinations of three HDD failures that cause a system failure is linearly related to a total number of HDDs in the array of HDDs.

9. A device adapter for controlling access to an array of hard disk devices (HDDs) organized in a two-dimensional structure of rows and columns of HDDs, the device adapter comprising:
access control logic to manage read requests and write requests to the HDDs in the array of HDDs, the access control logic mapping a full stride of data elements and checksum elements to the array of HDDs, wherein each element in the full stride resides on a physically independent HDD in the array of HDDs, and further wherein the access control logic supports element position rotation between successive full strides, wherein the position of each element in each full stride relative to the array of HDDs is rotated to a different position between successive full strides relative to the array of HDDs;
checksum calculation logic to calculate a row checksum element and a column checksum element of the data elements in the full stride, the row checksum element and the column checksum element updated as part of a write operation updating one or more of the data elements in the full stride;
HDD failure detection logic to identify a failed HDD in the array of HDDs; and
correction logic utilizing at least one of the row checksum element and the column checksum element to correct an element of a full stride containing a failed HDD in response to the HDD failure detection logic identifying the failed HDD.

10. The device adapter of claim 9, wherein the row checksum element is calculated as an exclusive-OR (XOR) summation of all data elements in a row of the full stride; and
the column checksum element is calculated as an XOR summation of all data elements in a column of the full stride.

11. The device adapter of claim 10, wherein the access control logic further performs replacing old data in a data element of the full stride with new data, the old data included in an old row checksum and an old column checksum;
the checksum calculation logic further performs:
calculating a new row checksum as an XOR summation of the old row checksum, the new data, and the old data; and
calculating a new column checksum as an XOR summation of the old column checksum, the new data, and the old data; and
the access control logic further performs:
writing the new row checksum to the row checksum element; and
writing the new column checksum to the column checksum element.

12. The device adapter of claim 9, wherein the correction logic corrects an element in an element row of the full stride containing the failed HDD as a checksum calculation of all other elements in the element row of the full stride containing the failure; and
the correction logic corrects an element in an element column of the full stride containing the failure as a checksum calculation of all other elements in the element column of the full stride containing the failure.

13. The device adapter of claim 9, wherein the failure detection logic determines the number of failures in the full stride and the correction logic selects a sequence of correction based upon a distribution of failures in the full stride through identifying rows or columns containing single failures as initial elements to correct.

14. The device adapter of claim 9, wherein the access control logic, the HDD failure detection logic, the checksum calculation logic, and the correction logic further support:
a reserved element;
an additional HDD in the array of HDDs, the additional HDD providing capacity for inclusion of a reserved element in the full stride; and
wherein the reserved element is populated with at least one of a checksum calculation of all row checksum elements in the full stride and a checksum calculation of all column checksum elements in the full stride.

15. The device adapter of claim 9, wherein the access control logic, the HDD failure detection logic, the checksum calculation logic, and the correction logic further support a spare HDD in the array of HDDs, the spare HDD providing capacity to rebuild a failed HDD.

16. The device adapter of claim 9, wherein the access control logic further performs tandem device adapter control for operating one or more additional device adapters collectively or redundantly.

17. The device adapter of claim 9, wherein a number of combinations of three HDD failures that cause data loss in the array of HDDs is linearly related to a total number of HDDs in the array of HDDs.

18. A method for providing enhanced tolerance to data loss on three hard disk devices (HDDs) in an array of HDDs, the method comprising:
organizing the array of HDDs in a two-dimensional structure of rows and columns of HDDs;
partitioning the rows and columns of HDDs into rows and columns of elements, each element having an element type, wherein a first element type is a data element and a second element type is a checksum element;
creating a full stride from the rows and columns of elements, including an element from each HDD in the rows and columns of HDDs, each element in the full stride residing on a physically independent HDD;
calculating a row checksum element as a checksum of all data elements in a row of the full stride;
calculating a column checksum element as a checksum of all data elements in a column of the full stride;

wherein the row checksum element calculation and the column checksum element calculation intersect at a single data element, the row checksum element and the column checksum element updated as part of a write operation updating the data element;

using the row checksum element and the column checksum element to correct one or more HDD failures in the array of HDDs; and rotating element positions between successive full strides, wherein the position of each element in each full stride relative to the array of HDDs is rotated to a different position between successive full strides relative to the array of HDDs.

19. The method of claim 18, further comprising:

detecting one or more HDD failures in the array of HDDs;

determining the number of failures in a full stride containing the one or more HDD failures;

selecting a sequence of correction based upon a distribution of failures in the full stride through identifying rows or columns containing single failures as initial elements to correct;

wherein using the row checksum element to correct the one or more HDD failures in the array of HDDs comprises:
correcting an element in an element row of the full stride containing the one or more HDD failures as a checksum calculation of all other elements in the element row of the full stride containing the one or more HDD failures; and wherein using the column checksum element to correct the one or more HDD failures in the array of HDDs comprises:
correcting an element in an element column of the full stride containing the one or more HDD failures as a checksum calculation of all other elements in the element column of the full stride containing the one or more HDD failures.

20. The method of claim 18, further comprising:

replacing old data in a data element of the full stride with new data, the old data included in an old row checksum and an old column checksum, wherein the old row checksum and the old column checksum are XOR summation checksums;

calculating a new row checksum as an XOR summation of the old row checksum, the new data, and the old data;

writing the new row checksum to the row checksum element;

calculating a new column checksum as an XOR summation of the old column checksum, the new data, and the old data; and writing the new column checksum to the column checksum element.

21. The method of claim 18 further comprising a third element type, wherein the third element type is a reserved element; and
wherein the reserved element is populated with at least one of a checksum calculation of all row checksum elements in the full stride and a checksum calculation of all column checksum elements in the full stride.

22. The method of claim 18, wherein a number of combinations of three HDD failures that cause data loss is linearly related to a total number of HDDs in the array of HDDs.

23. A redundant array of independent disks (RAID) storage system comprising:

more than one array of hard disk devices (HDDs), each array of HDDs organized in a two-dimensional structure of rows and columns of HDDs;

each array of HDDs including more than one full stride, each full stride logically partitioning the rows and columns of HDDs into rows and columns of elements, each full stride including an element from each HDD in the rows and columns of HDDs, each element in each full stride residing on a physically independent HDD;

each element having an element type, wherein a first element type is a data element and a second element type is a checksum element;

row checksum elements calculated as a checksum of all data elements in a row of each full stride;

column checksum elements calculated as a checksum of all data elements in a column of each full stride;

wherein each element position in each full stride relative to each array of HDDs is rotated to a different position between successive full strides relative to each array of HDDs; and more than one device adapter for controlling access to the more than one array of HDDs, each device adapter calculating the row checksum elements and the column checksum elements, each device adapter operating in tandem providing redundant access control for the more than one array of HDDs.

24. The system of claim 23, wherein each device adapter further performs:

detecting one or more failures in the more than one array of HDDs;

determining the number of failures in the more than one array of HDDs;

selecting a sequence of correction;

correcting an element in an element row of a full stride containing a failure as a checksum calculation of all other elements in the element row of the full stride containing the failure; and correcting an element in an element column of a full stride containing a failure as a checksum calculation of all other elements in the element column of the full stride containing the failure.

25. The system of claim 23 further comprising:

a third element type, wherein the third element type is a reserved element; and an additional HDD in at least one of the arrays of HDDs, the additional HDD providing capacity for inclusion of a reserved element in each full stride;

wherein each reserved element is populated with at least one of a checksum calculation of all row checksum elements in each full stride and a checksum calculation of all column checksum elements in each full stride.

26. The system of claim 23 further comprising one or more spare HDDs in each array of HDDs, the one or more spare HDDs providing capacity to rebuild a failed HDD.

27. The system of claim 23, wherein a number of combinations of three HDD failures that cause a system failure is linearly related to a total number of HDDs in each array of HDDs.

28. A computer program product for providing enhanced tolerance to data loss in an array of HDDs, the computer program product comprising:

a storage medium readable by a processing circuit and storing instructions for execution by the processing circuit for facilitating a method comprising:
organizing the array of HDDs in a two-dimensional structure of rows and columns of HDDs;
partitioning the rows and columns of HDDs into rows and columns of elements, each element having an element type, wherein a first element type is a data element and a second element type is a checksum element;

creating a full stride from the rows and columns of elements, including an element from each HDD in the rows and columns of HDDs, each element in the full stride residing on a physically independent HDD;

calculating a row checksum element as a checksum of all data elements in a row of the full stride;

calculating a column checksum element as a checksum of all data elements in a column of the full stride;

wherein the row checksum element calculation and the column checksum element calculation intersect at a single data element, the row checksum element and the column checksum element updated as part of a write operation updating the data element;

using the row checksum element and the column checksum element to correct one or more HDD failures in the array of HDDs; and rotating element positions between successive full strides, wherein the position of each element in each full stride relative to the array of HDDs is rotated to a different position between successive full strides relative to the array of HDDs.

29. The computer program product of claim 28 further comprising:

detecting one or more HDD failures in the array of HDDs;

determining the number of failures in a full stride containing the one or more HDD failures;

selecting a sequence of correction based upon a distribution of failures in the full stride through identifying rows or columns containing single failures as initial elements to correct;

wherein using the row checksum element to correct the one or more HDD failures in the array of HDDs comprises:

correcting an element in an element row of the full stride containing the one or more HDD failures as a checksum calculation of all other elements in the element row of the full stride containing the one or more HDD failures; and wherein using the column checksum element to correct the one or more HDD failures in the array of HDDs comprises:

correcting an element in an element column of the full stride containing the one or more HDD failures as a checksum calculation of all other elements in the element column of the full stride containing the one or more HDD failures.

30. The computer program product of claim 28 further comprising a third element type, wherein the third element type is a reserved element; and wherein the reserved element is populated with at least one of a checksum calculation of all row checksum elements in the full stride and a checksum calculation of all column checksum elements in the full stride.

* * * * *